United States Patent [19]
Foster et al.

[11] Patent Number: 5,967,462
[45] Date of Patent: Oct. 19, 1999

[54] WATER BOMBER FLOAT PLANE AND METHOD OF WATER BOMBING

[75] Inventors: Robert George Foster; Bruce James Holland, both of Burlington, Canada

[73] Assignee: Her Majesty the Queen in right of Canada, as represented by the Minister of Natural Resources, Saulte Ste Marie, Canada

[21] Appl. No.: 08/947,935

[22] Filed: Oct. 9, 1997

[51] Int. Cl.⁶ .............................. B64D 1/00; B64C 35/00
[52] U.S. Cl. ........................................ 244/136; 244/105
[58] Field of Search .................................. 244/136, 105, 244/106; 239/171; 141/108

[56] References Cited

U.S. PATENT DOCUMENTS

| | | | |
|---|---|---|---|
| 1,603,304 | 10/1926 | Zimmermann | 244/105 |
| 1,752,874 | 4/1930 | Zindel | 244/105 |
| 3,423,053 | 1/1969 | Hawkshaw | 244/136 |
| 3,754,601 | 8/1973 | Linkewich | 244/136 |
| 3,790,109 | 2/1974 | Fischer | 244/105 |
| 4,474,350 | 10/1984 | Hawkshaw | 244/136 |
| 4,936,389 | 6/1990 | MacDonald et al. | 244/136 |
| 5,326,053 | 7/1994 | Pahl et al. | 244/136 |

*Primary Examiner*—Charles T. Jordan
*Assistant Examiner*—Theresa M. Wesson

[57] ABSTRACT

An amphibious water bomber float plane, wherein the water bomber plane is equipped with a pair of floats for landing and taking off on water, with wheels for use on land, and having pair of floats secured for supporting the plane on water, water tanks within the floats for accumulating water for water bombing, scoops mounted in each float for lowering and raising between lowered and raised positions, and, when in the lowered position, the scoops entering the surface of the water causing water to flow upwardly into the tanks, dump doors mounted in each float, in communication with the tanks, the dump doors being swingable between an open dumping position and a closed sealed position, and controls by which the dump doors may be operated from the plane. Also disclosed is a method of water bombing from an amphibious float plane.

29 Claims, 7 Drawing Sheets

WATER BOMBER FLOAT PLANE AND METHOD OF WATER BOMBING

FIELD OF THE INVENTION

The invention relates to a water bomber aircraft and in particular to a float plane in which the floats are equipped to pick up and release water for water bombing and to assemblies for use in water bombers and to a method of water bombing.

BACKGROUND OF THE INVENTION

Controlling of forestry fires by means of aerial bombing with water, or by water with fire retardant, has proved to be particularly successful. It enables fire control personnel to start dealing with a new fire within a matter of a few hours from when it is first detected, even though the fire may be located in remote bush country which is inaccessible by land.

In the past, water bombers have usually been relatively small sea planes or large amphibious aircraft. Such amphibious aircraft usually have a central fuselage which is equipped with a profile or hull having a lower shape which is adapted to land on the water, and is equipped with wing tip floats to balance the aircraft when on the water. Small sea planes in the past have been equipped with external water bombing tanks fitted to the floats of the aircraft, or with integral tanks located within the floats.

In most cases, either water is taken into the plane, in an integral compartment in the main hull of the plane, or in external tanks by skimming or taxiing across the surface of a lake. The water is then released by flying over strategic points of the fire, and opening doors in the main hull, or in each aircraft pontoon, or in tanks. Older sea planes equipped with external tanks released water by mechanically rolling the tanks over and dumping water out of the tanks.

Amphibious water bombers are relatively large and represent a substantial investment, and are costly to maintain and costly to operate.

Sea planes must normally be located at central water base facilities, where such planes can be maintained and such facility must also have access to water for take-off and landing of the aircraft.

It has been found to be desirable to provide a more versatile form of water bomber, which is adapted as an amphibian, so that it has wheels to land and take off from a runway, and floats to land and take off on the water, and which is somewhat smaller and less expensive to buy and operate. In addition, such aircraft can be dispersed somewhat more widely in the locality of smaller lakes or landing strips where fires may be expected, so that the flying time from the take-off point to the fire may be greatly reduced. This will also give the aircraft greater endurance time over the fire before it must return to its base to refuel.

BRIEF SUMMARY OF THE INVENTION

With a view to providing some of the foregoing advantages and features, the invention comprises a water bomber float plane, wherein the water bomber plane is equipped with a pair of floats for landing and taking off on water, and comprising, a pair of floats secured to the underside of said plane, for supporting same on water, water tank means within said floats for accumulating water for water bombing, scoop means mounted in each said float, and operating means for lowering and raising said scoop means between lowered and raised positions, and, when in said lowered position, said scoop means being adapted to enter the surface of the water, and cause water to flow upwardly into said tank means, dump doors mounted in each said float, in communication with said tank means, said dump doors being swingable between an open dumping position and a closed sealed position, operating means for operating said dump doors between said open and closed positions, and controls in said plane whereby said dump doors may be operated from said plane.

The invention further contemplates that the floats will incorporate wheel means which can be raised and lowered, whereby in the lowered position the plane can land and take-off on a solid runway, and wherein in said raised position said plane can land and take off on water.

The invention further contemplates that the scoop means may be provided with hydraulic operating means, for lowering and raising said scoop means, and hydraulic control means in said plane whereby said hydraulic means may be controlled and operated.

The invention further contemplates that the scoop means is in communication with a water flow chute mounted within each float, whereby water scooped up by said scoop, will be driven up said chute, and discharged within said tank means.

The invention further contemplates that the plane is equipped with fire retardant or foam injection additive containers which are incorporated in the floats of the plane, and means connecting said containers to said water tank means, whereby predetermined quantities of fire retardant may be added to the water contents of said tank means.

The invention further contemplates that said dump doors shall comprise a pair of doors on each said float, said doors being swingable downwardly and outwardly for opening and dumping, thereby providing accurate guidance of water from said water tank means into the desired direction.

The invention further contemplates that the door means shall be provided with seals, for sealing said doors together, and further seals for sealing said doors against fixed portions of said floats, whereby, when said doors are closed, said water tank means are sealed against the entry or escape of water.

The invention further contemplates the provision of upper opening means on said water tank means, said upper opening means communicating with the atmosphere and permitting outflow and inflow of air, and also permitting outflow of excess water when said water tank means are filled.

The floats themselves are amphibious floats having wheels which are extendible and retractable so that the aircraft can land on land or on water.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

Figure 7:
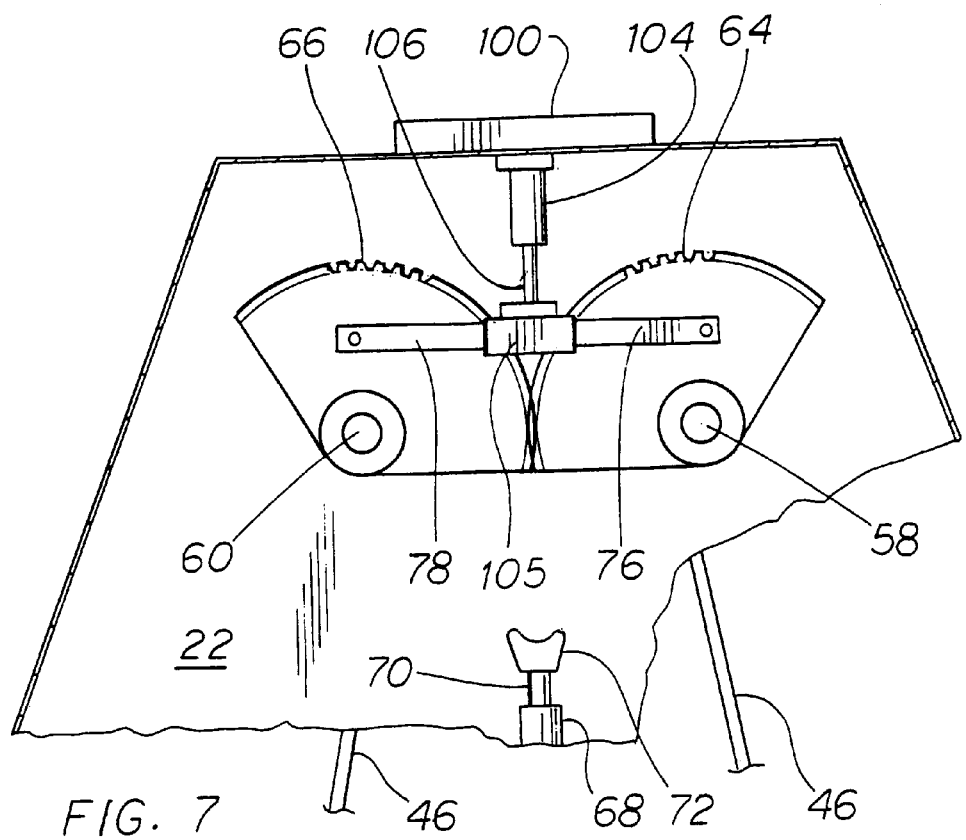
FIG. 7 is a front elevational view of the door operating mechanism.
Figure 8:
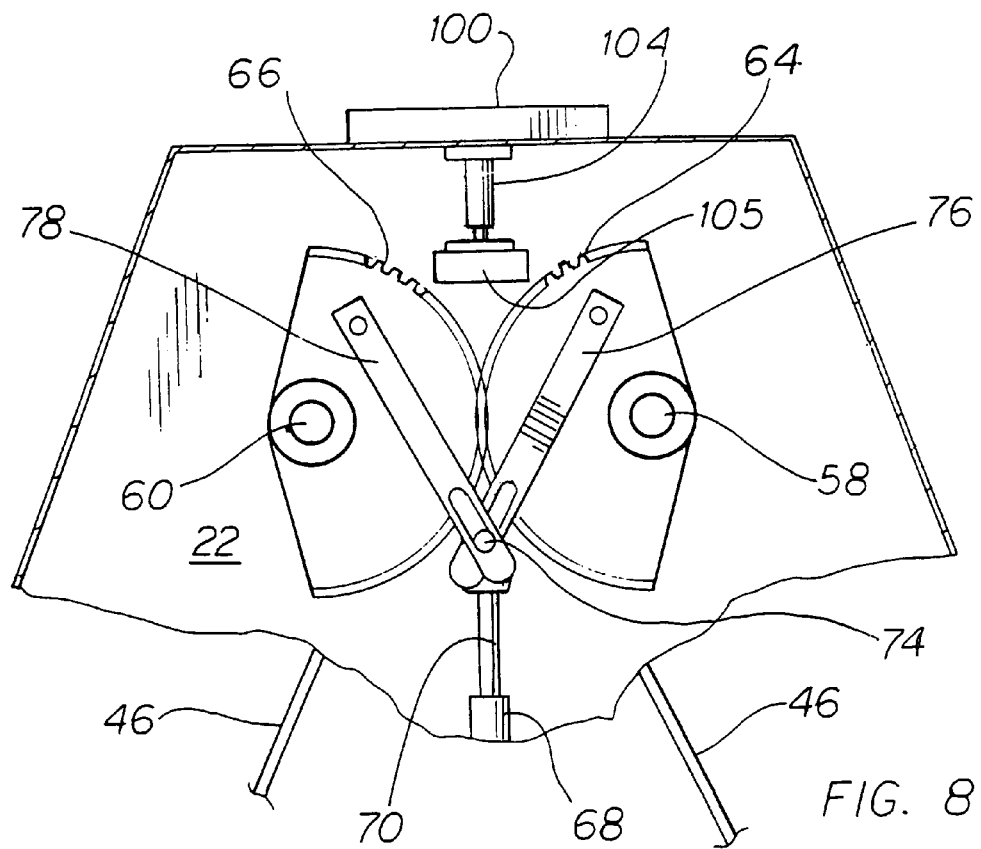
Figure 9:
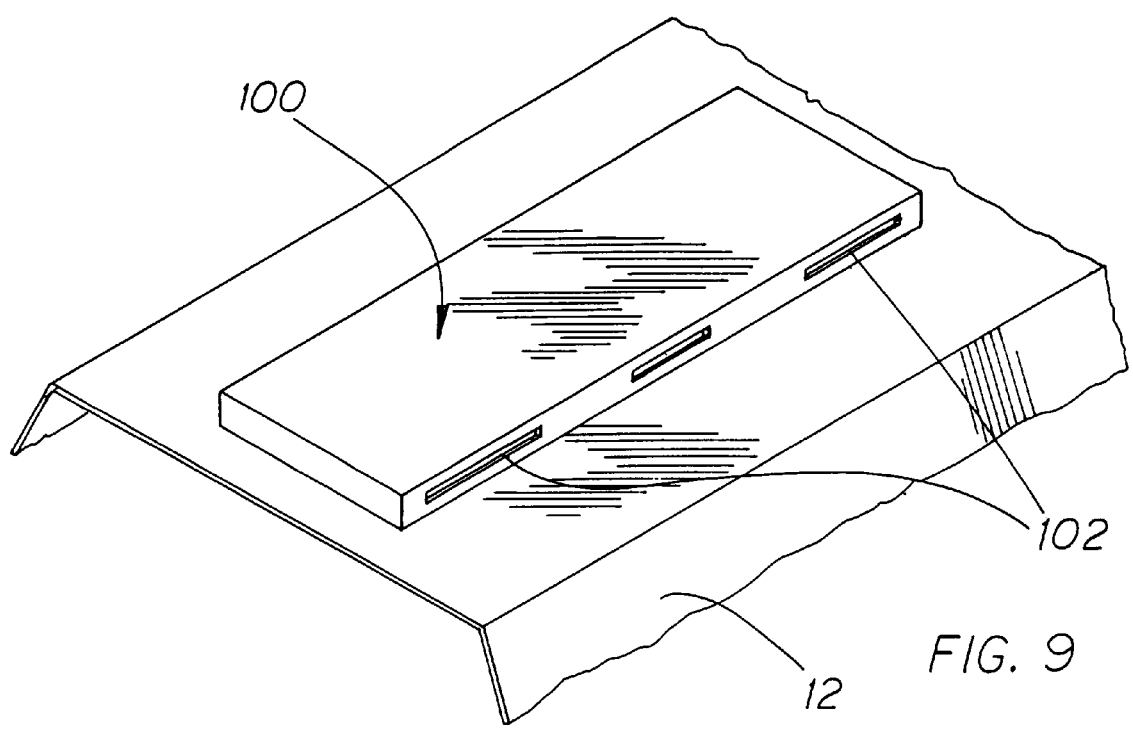
Figure 10:
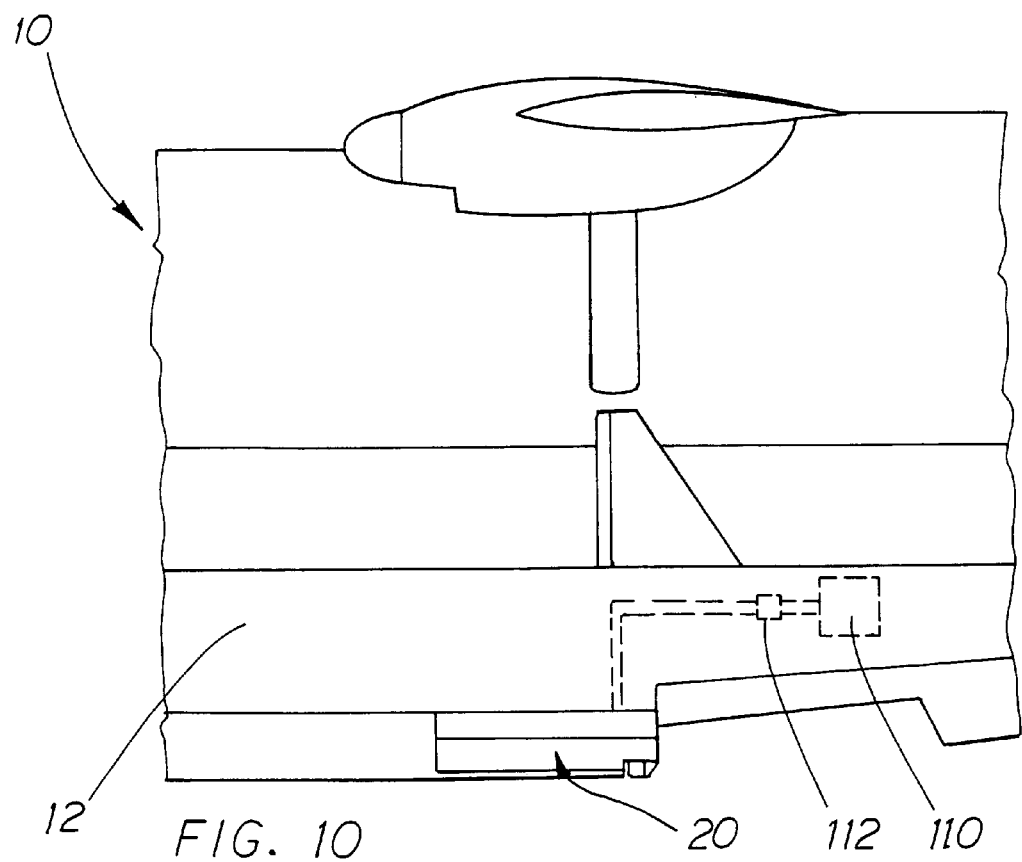

FIG. 8 corresponds to FIG. 7 showing the door operating mechanism in another position;

FIG. 9 is a top perspective illustration of one float, showing the upper surface of the float with upper openings for permitting outflow of excess water, and for permitting inflow and outflow of air; and FIG. 10 is a schematic illustration of a side view of a float showing the installation of a fire retardant chemical tank.

DESCRIPTION OF A SPECIFIC EMBODIMENT

As already explained, the invention relates generally to water bombing aircraft of the type which are required to carry a load of water over a fire site, and then dump it on the fire at a desired location. The particular aircraft to which the invention is applicable is a float plane, typically a twin engine float plane of the type having amphibious floats, equipped with retractable wheels so that the aircraft can land and take off from land or water. Such aircraft can land and take off on shorter runways, and as such, are more flexible in terms of location than conventional larger water bombers. Consequently such aircraft are more readily available to treat fires at a very early stage, even in remote locations.

In accordance with the invention, in order to achieve these results the floats themselves are equipped with water containing tanks in a manner to be described, and means by which water can be scooped up from the surface of the lake into the tanks and then flown quickly to the fire location and dumped, with repeated flights enabling the rapid efficient treatment of a fire soon after it is detected.

Figure 1:
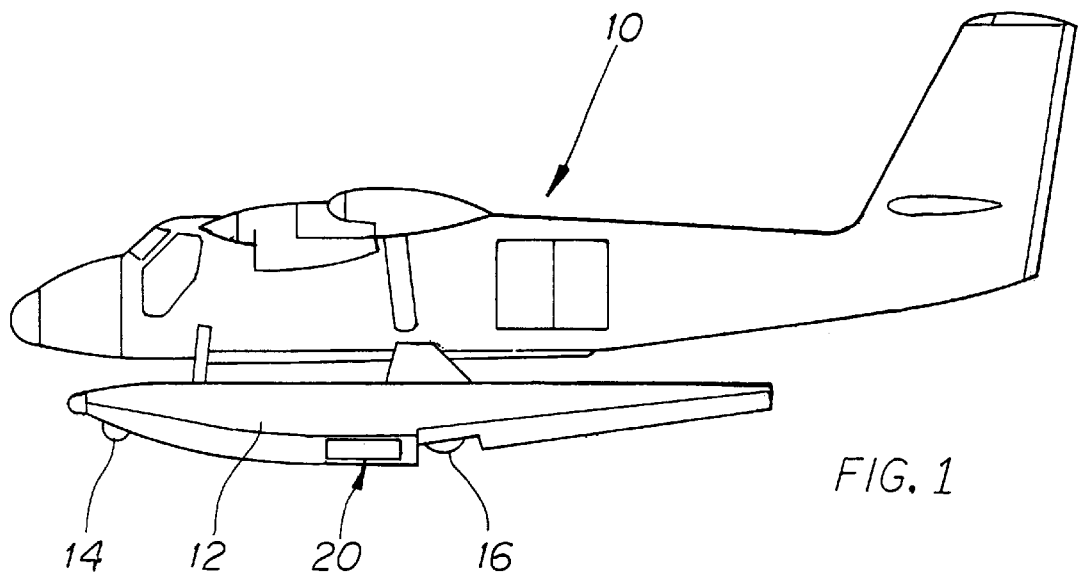
FIG. 1 is a side-elevational view in schematic form of a float plane, equipped with floats illustrating the invention.
Figure 2:
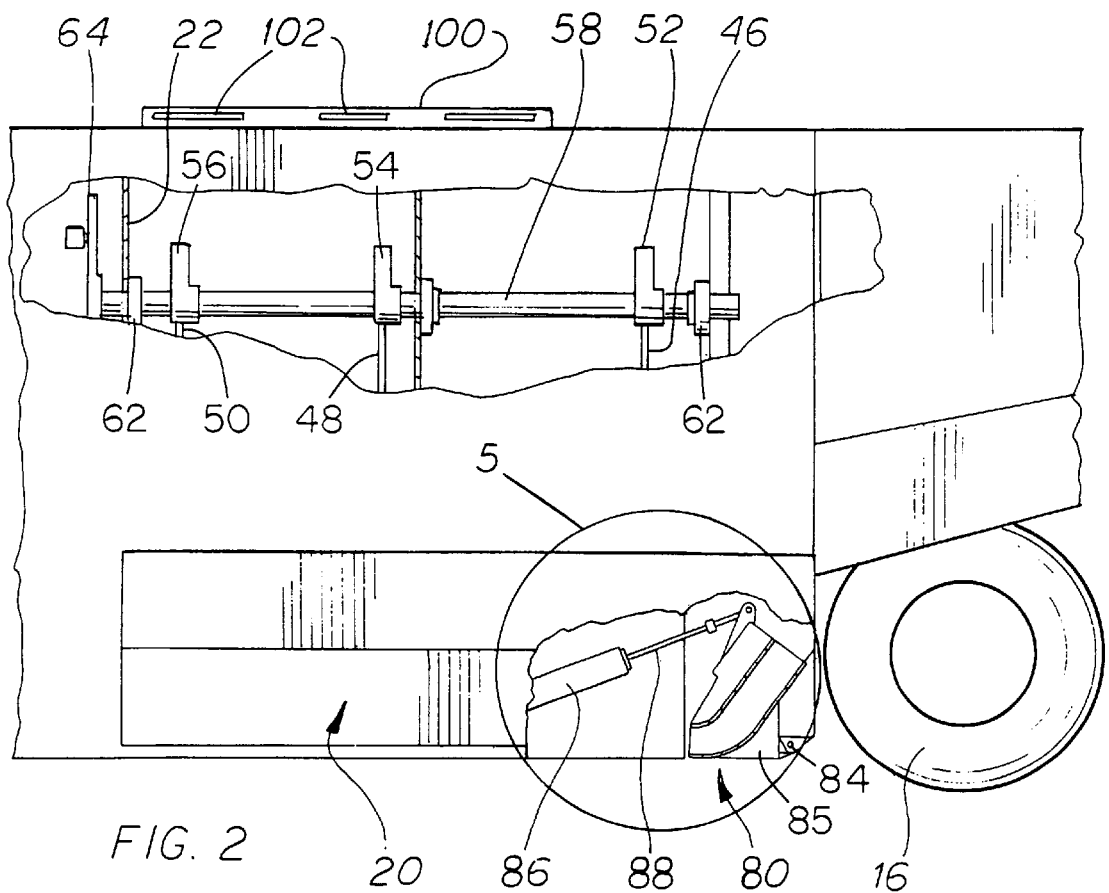
FIG. 2 is a greatly enlarged cut away side elevation of a portion of one float, shown with some structure cut away to reveal the interior of a tank.
Figure 4:
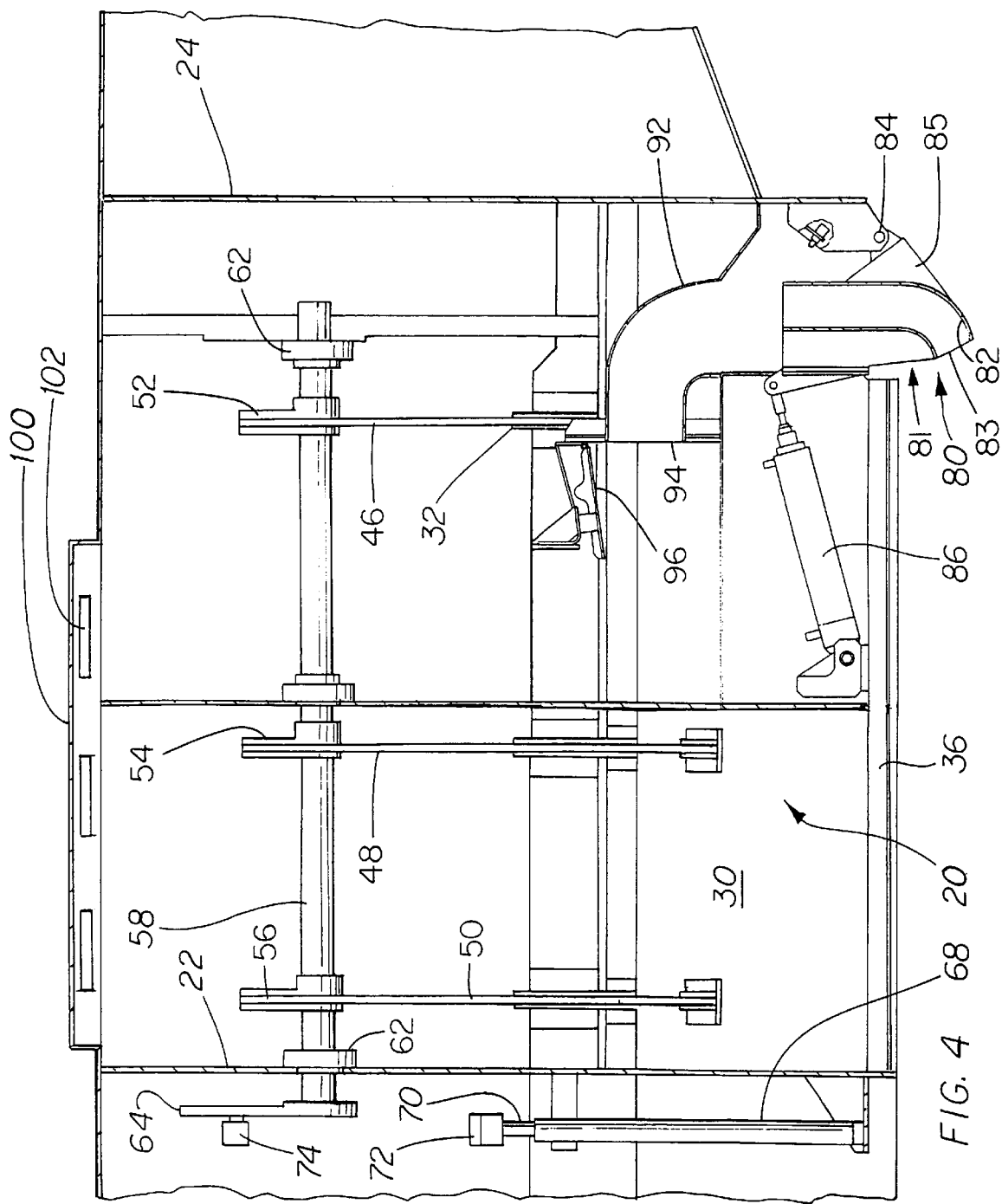
FIG. 4 is an enlarged longitudinal section of a tank of FIG. 2.
Figure 5:
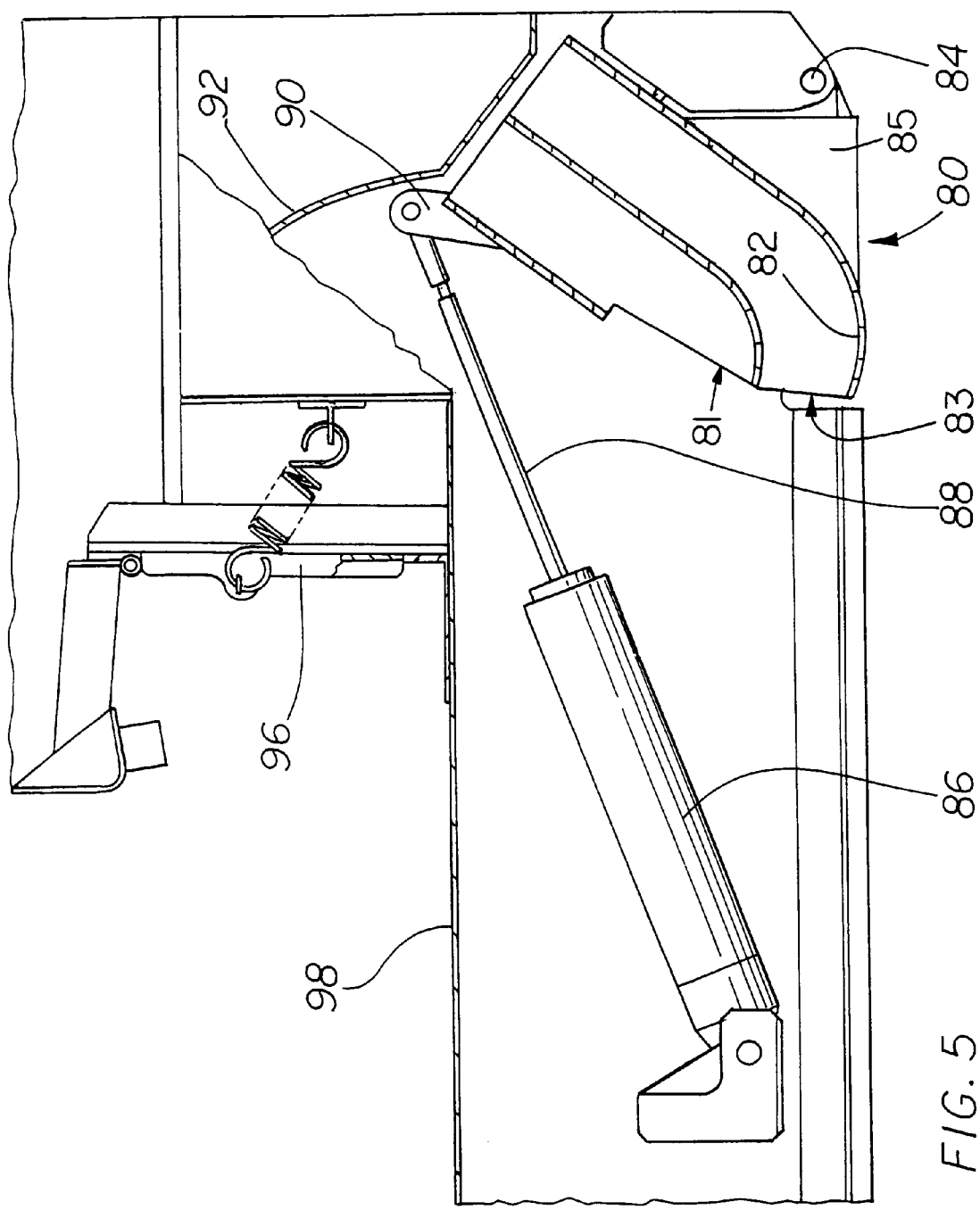
FIG. 5 is a section of the detail shown in the circle 5 of FIG. 2 illustrating the water scoop mechanism.
Figure 6:
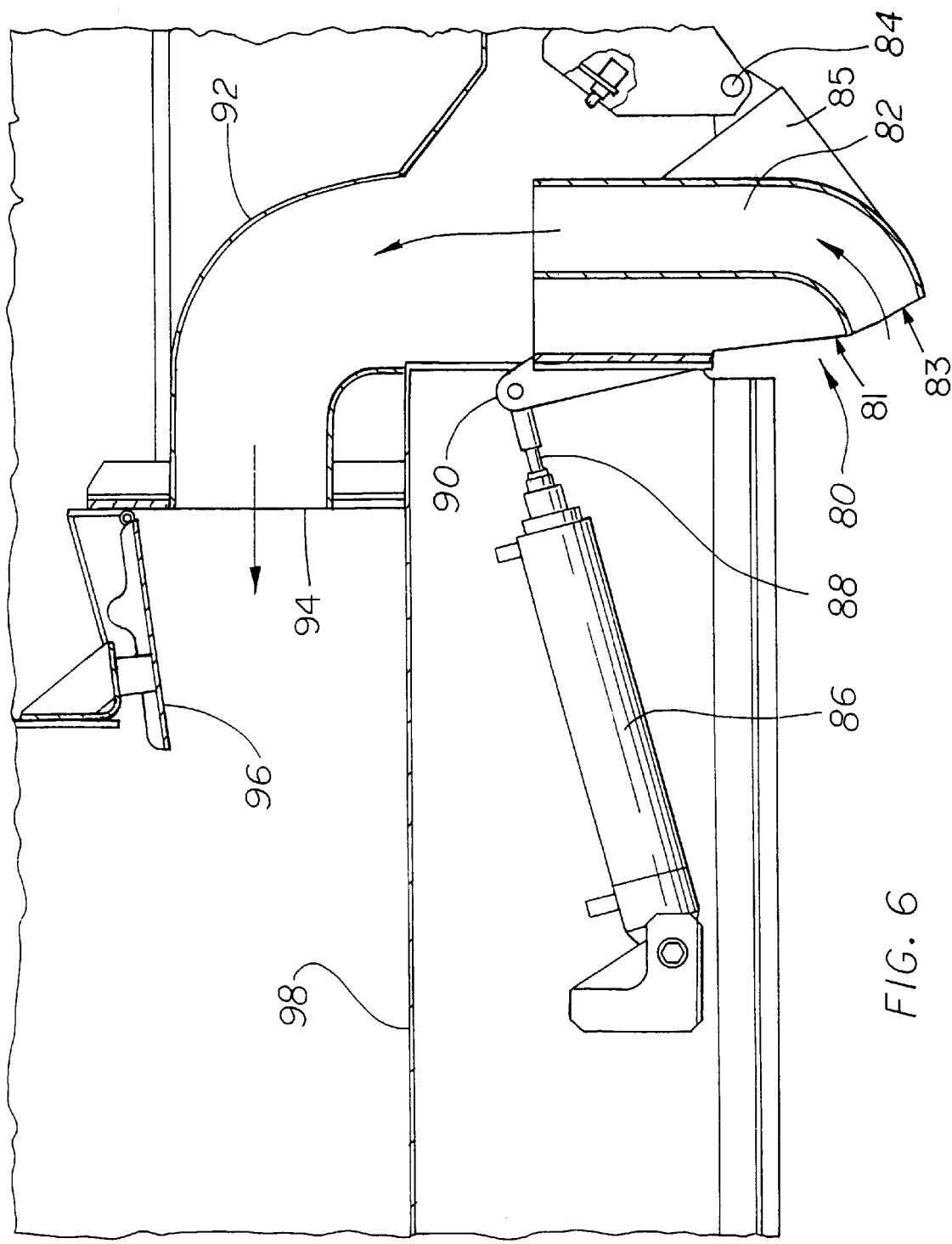
FIG. 6 is an illustration partially in section corresponding to FIG. 5 illustrating the water scoop lowered for collecting water.

Referring now in more detail to FIGS. 2, 4 and 5, the aircraft indicated generally as 10 has floats 12, and the floats 12 have front and rear wheels 14 and 16 which may be extended and retracted in a conventional manner.

In order to contain water for dumping, each of the floats is provided with a water collecting tank 20 having forward and rear tank walls 22 and 24. The centre of gravity of each of the tanks is located under the wing area of the aircraft so that as the tanks fill, and empty, they will not exceed the acceptable flight envelope of the aircraft or otherwise adversely affect its flying characteristics.

The remainder of the floats are principally full of air as in conventional floats on float planes.

The front and rear walls 22 and 24 extend completely over the interior cross-sectional area of the floats, so as to provide a sealed separate water chamber, and preventing water from entering the remainder of the floats.

In order to dump water from the water tanks effectively on a fire it is desirable that the dumping shall take place rapidly so that substantially all the volume of water is released in a very short space of time. It is also desirable that the bodies of water from the two tanks shall be capable of being more or less directed from the aircraft, at least when they are released from the floats so that in this way the largest concentration of water can be directed to the fire location which is perceived as requiring immediate treatment. Clearly, it is not possible to maintain a body of water in a cohesive mass after it has been released, and the water will tend to break up and form droplets as it pours downwardly. However, it is found that provided the water can be released in a very short space of time, and in a directed manner, that it will descend in a mass, and land on the desired location, and thus have the greatest effect.

In order to do this, the floats are provided, in the area of the water tanks, with right and left hand dump doors 28 and 30. The dump doors are pivotally mounted on opposite sides of each float at hinges 32 and 34 so that they swing downwardly and outwardly. The dump doors are provided with exterior contours, corresponding to the contouring of the rest of the float, so as to provide continuity of the designed water engaging surfaces of the float of the particular aircraft to which the invention is applied.

A central sealing rib 36 is provided along the centre of the water tank, and has water seals thereon. The dump doors have upper and lower seals 42 and 44 engaging respectively the side edges of the tank, when the doors are closed, thereby providing a good water tight seal.

In order to operate the dump doors in a rapid and uniform manner, each of the doors is provided with in this case three door operating rods 46, 48, 50. The rods are connected to operating arms 52, 54, 56. The operating arms are mounted on right and left hand rotary operating tubes or shafts 58, 60. The shafts are rotatably supported in bearings 62 mounted on the front and rear walls of each tank. Forward of the front wall the shafts 58, 60 are interconnected by means of gear segments 64, 66, so as to procure rotation of the shafts in unison in opposite directions. This will ensure uniform rapid operation of both dump doors simultaneously. Opening of the dump doors, once they are unlocked by means to be described, will take place under the influence of gravity, due to the weight of the water in the tanks. To close the doors, both gear segments will be rotated in unison, by means to be described, thereby raising all rods 46, 48, 50, simultaneously and swinging both doors firmly closed against their seals.

Figure 3:
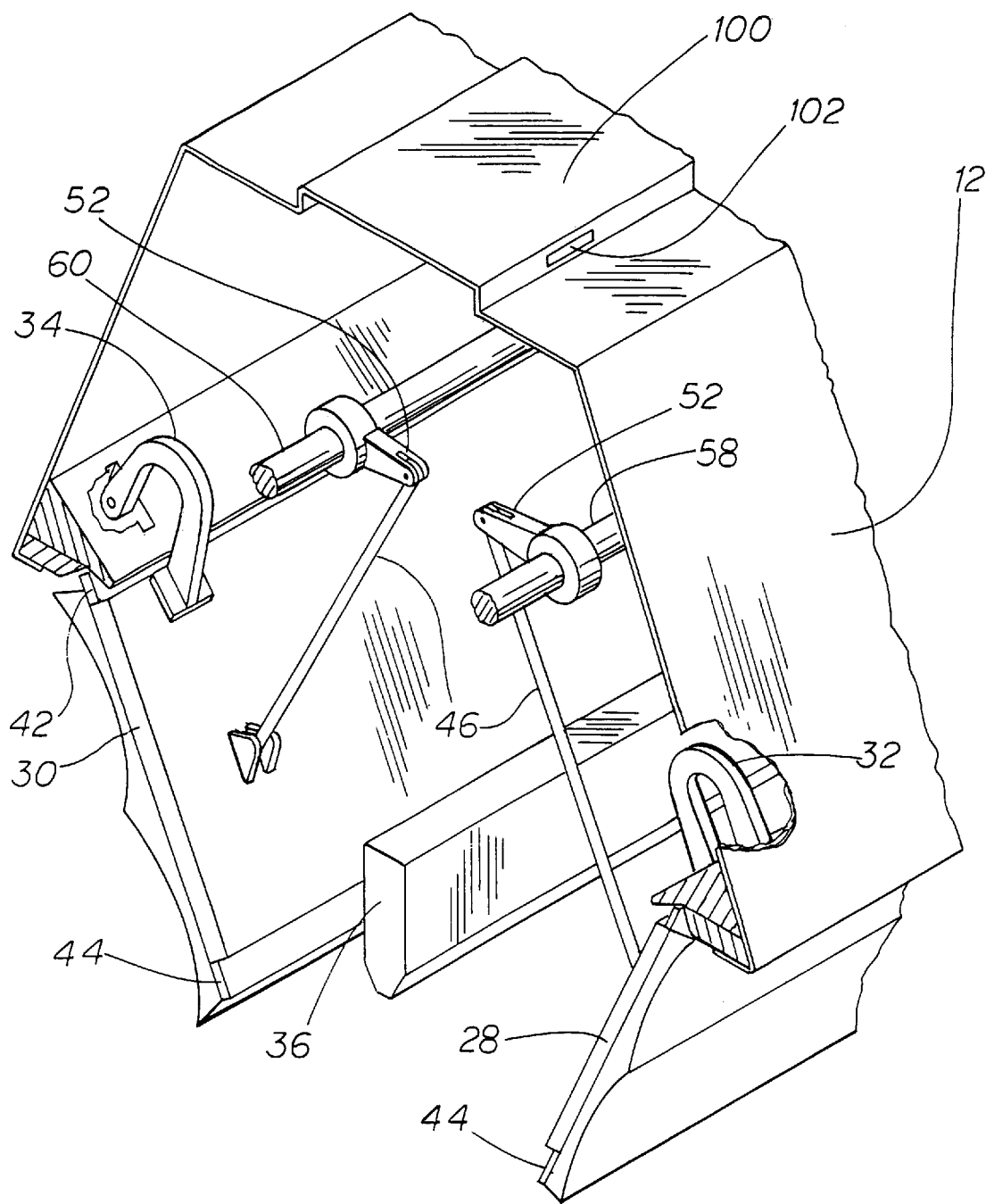
FIG. 3 is a cut away perspective view of one float of the aircraft of FIG. 1, showing the tank with the dump doors open, to indicate the manner of ejection of water.

In order to permit the widest possible door opening, the doors are provided with hinges 32, 34 which are of generally U shape so as to permit the doors to be swung into a fully open position as illustrated in FIG. 3 without encountering the edges of the tanks.

Closing of the doors 28, 30 is achieved by power operated means, in this case hydraulic cylinder 68. A piston rod 70 extends from cylinder 68 and has a U shaped yoke 72 at its upper end. Yoke 72 is located so as to engage pivot or boss 74. Pivot 74 is mounted at the pivot point between bars 76, 78. The bars are connected to the gear segments 64, 66, and are moveable between a downwardly swung door open position, and an upwardly swung door closed position. In the door closed position the bars lock and hold the doors closed and sealed. However when the doors are released and swung downwardly the bars swing down and bring the boss into the yoke 72. When it is desired to close the doors after dumping water, the cylinder 68 is operated driving the rod 70 and yoke 72 upwardly. This will force pivot or boss 74 upwardly and swing gear segments 64, 66. This in turn will rotate shafts 58, 60, and cause arms 52, 54, 56, to swing upwardly. This will raise rods 46, 48, 50 upwardly, and cause doors 28, 30 to close against their seals.

In order to fill the tanks 20 with water, the aircraft is flown so as to perform a false landing on the surface of a body of water such as a lake. The floats of the plane will touch the surface of the water, while the plane in fact taxies along the surface of the water, without landing.

In order to pick up water from the lake, a scoop assembly 80 is provided on each float as illustrated generally in FIG. 5.

The scoop assembly comprises a scoop member 82 defining a foward side 81 having an opening 83 therein pivotally mounted at pivot 84 braket 85 on the underside of each float, rearwardly of the tanks 20. The bracket 85 is mounted rearward of the forward side 81 of the scoop 82. The scoop assembly is normally in its upper position as shown, and can be swung downwardly into the surface of the lake by operation of an operating cylinder 86. Cylinder 86 has a piston rod 88 connected to arm 90 of scoop 82. When the scoop assembly 80 is in its upper position, the piston rod 88 is fully extended.

As shown in phantom, the operation of the cylinder will cause the scoop to swing forwardly and downwardly into the surface of the water. When the scoop assembly 80 is in its lower position, that is, when the scoop 82 is in the surface of the water, the piston rod 88 is fully retracted. Due to the speed of the aircraft as it taxiis across the surface of the water, water is rapidly picked up by the two scoops, and is driven upwardly into their respective tanks.

In order to control the flow of water upwardly into the tanks, a water flow conduit 92 or chute is provided in each of the floats. The lower end of the conduit 92 is provided with an entrance opening which communicates with the probe or scoop 82. The conduits are generally in the shape of a letter U, and have exit openings 94 directing water forwards into their respective tanks.

In this way, as water is scooped up by the scoops it is driven up and around the water conduits, and flows into each of the tanks. Closure flaps 96 are provided at the exit openings 94 of each of the conduits or chutes, and are spring operated to remain normally closed. The force of the water being driven up each of the conduits will open the flap doors to permit the tanks to fill, after which the closure flaps will swing shut. The scoop assemblies 80, and conduits 92 are located within the lower region of each tank, and are enclosed by walls 98.

In practice the tanks rapidly fill with water. In order to provide visual indication to the pilot that the tanks are full, the floats, in the region of the tanks, are provided with generally rectangular upward extensions 100. The upward extensions are of generally flattened rectangular shape and are formed with a plurality of side openings 102.

The function of the side openings 102 is two-fold. In the first place, as the tanks are filling, air in the tanks is driven out through the openings.

In the second place, when the tanks are filled, and water is continually picked up by the probes, water will start to gush out of the openings. This will provide a visual indication to the pilot that the tanks are full. He then operates cylinders 86 to raise and close probes or scoops 82 so that they no longer engage the surface of the water and no longer pick up any more water from the lake.

The pilot is then free to increase the speed of the aircraft and take off once more, to return to the fire site.

At the fire site, the pilot will select the location requiring the most immediate water bombing treatment. He will fly low over that location, and will then operate door release (described below) of each tank 20, thereby abruptly swinging the doors 28,30 open rapidly under the force of the weight of water. This will produce a rapid and complete dumping of the water from each tank in a controlled, directed manner, the two doors swinging open from the centre of the tank, providing some degree of guidance on either side of the water flowing outwardly and downwardly.

The maximum water bombing efficiency is thus achieved, given the volumes of water carried in the tanks in the first place.

Releasing of the door locking bars 76, 78 is achieved by the vertical pistons 104 and channels 105 and piston rod 106 which engage the bars at their central pivots 74, and push the bars downwardly, so that they are no longer locking the doors closed.

In order to increase the effectiveness of the water on the fire, fire retardant chemicals or foaming agents may be added to the water in the tanks. In the illustrated embodiment of the invention, fire retardant chemicals may be carried in the fire retardant additive containers 110 mounted in rear compartments of respective floats 12 of the aircraft.

As shown schematically in FIG. 10, each tank is provided with a pump 112, by means of which a predetermined proportion of the contents may be transferred to each water tank 20 to provide the desired increased effectiveness of the water in putting out the fire.

Finally, it will be appreciated that in order to increase the efficiency of the water dumping, it is desirable to provide air intakes for the tanks, so that there is no resistance to the gravity dumping of water from the tanks. These air openings are in fact provided by the openings 102 in the rectangular upward extensions 100 of each float 12.

In this way, the openings in the rectangular upward extension provide a triple function namely, release of air during filling of the tanks, overflow of water providing indication that the tanks are full, and entrance of air during dumping.

The method of fire bombing in accordance with the invention, will be easily understood from the above description.

When the plane reaches the fire site the pilot will fly to the closest available lake. At this point the doors 28, 30 of tanks 20 are of course closed and sealed. The pilot then lowers the scoops or probes 82 from each tank. He will bring the plane down for a false landing so that the floats touch the surface, but he maintains speed above landing speed. The scoops will enter the surface of the water, and water will be scooped up rapidly into the tanks. When full the water will overflow through openings 102, giving the pilot a visual indication that the tanks are full. He then raises the scoops, increases power, and takes off again. He flies to the fire site, which will usually be near at hand, and locates the critical point requiring treatment, and releases the door locking bars 76–78. The doors 28, 30 then fall open under the weight of the water in the tanks, and the water falls down on the fire. If desired the pilot can operate pumps 112 so as to transfer doses of chemical to each of the water tanks 20, before dumping. After dumping, the pilot then operates cylinders 68 causing doors 28, 30 to swing upwardly into the closed position, and he returns to the lake to pick up a fresh load of water.

He can repeat this process frequently since the typical twin engine float plane can operate well in confined areas, thereby conserving fuel and being able to carry out a considerable number of water bombing trips on the fire before being required to return to his base.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A water bomber float plane, wherein the water bomber plane is equipped with a pair of floats for landing and taking off on water, comprising;

water tank means within said floats for accumulating water for water bombing;

scoop means mounted in each said float, said scoop means defining a forward side, said forward side defining an opening for receiving water therein;

pivotal mounting brackets pivotally mounting said scoop means within each respective said float, said pivotal mounting brackets provided rearward of said forward side of said scoop means;

pivots pivotally mounting said pivot brackets in respective said floats, said pivots provided rearward of said forward side of said scoop means;

scoop operating means for swinging said forward side of said scoop means on said pivotal mounting brackets about said pivots between lowered and raised positions, and, when in said lowered position, said scoop means being located to enter the surface of the water, and cause water to flow upwardly into said tank means;

pairs of dump doors mounted in each said float, in communication with said tank means, said dump doors being swingable between an open dumping position and a closed sealed position; and, operating means for operating said dump doors between said open and closed positions, and controls for said operating means in said plane.

2. A water bomber float plane as claimed in claim 1 wherein said floats incorporate wheel means whereby the plane can land and take-off on a solid runway.

3. A water bomber float plane as claimed in claim 1 further comprising hydraulic operating cylinder means connected to said scoop means, operable to swing said scoop means and said pivotal mounting brackets for lowering and raising said scoop means, and control means for said hydraulic operating cylinder means, said hydraulic operating cylinder means comprising a piston rod, wherein said piston rod is extended when said scoop means is in said raised position and is retracted when said scoop means is in said lowered position.

4. A water bomber float plane as claimed in claim 3 including a fixed water flow chute secured in fixed position within each float, whereby water scooped up by said scoop means passes up said chute, and is discharged from said chute within said tank means.

5. A water bomber float plane as claimed in claim 1 wherein said plane is equipped with fire retardant additive container means, and means connecting said container means to said tank means, whereby predetermined quantities of fire retardant are added to the water contents of said tank means.

6. A water bomber float plane as claimed in claim 1 wherein said dump doors comprise a pair of doors on each said float, said doors being swingable downwardly and outwardly on opposite sides of said tank means for opening and dumping said water, thereby providing accurate guidance of water from said water tank means into the desired direction.

7. A water bomber float plane as claimed in claim 6 wherein said pairs of doors are provided with seals, for sealing said doors together, and further seals for sealing said doors against fixed portions of said floats, whereby, when said doors are closed, said water tank means is sealed against the entry or escape of water.

8. A water bomber float plane as claimed in claim 6 and including front and rear bulkheads in said floats defining said tank means, and including door operating shafts in said tank means, said shafts extending through said front bulkheads, and power means located behind said front bulkheads for operating said shafts.

9. A water bomber float plane as claimed in claim 8 and including gear means mounted on said shafts behind said front bulkheads, said gear means meshing in pairs with one another whereby to coordinate simultaneous rotation of said shafts in respective said tank means in opposite directions.

10. A water bomber float plane as claimed in claim 9 and including linkage means connecting respective said shafts to respective said doors whereby rotation of said shafts causes simultaneous closing of said doors.

11. A water bomber float plane as claimed in claim 1 and including upper opening means on said water tank means, said upper opening means communicating with the atmosphere and permitting outflow and inflow of air, and also permitting outflow of excess water when said water tank means are filled.

12. A water bomber float plane as claimed in claim 1 including container means for containing a fire retardant chemical, and means for adding predetermined quantities of said fire retardant chemical to water collected in said tank means.

13. A water tank float assembly for use in association with a water bomber float plane, wherein the water bomber plane is equipped with a pair of floats for landing and taking off on water, said float assembly comprising;

a pair of floats adapted to be secured to the underside of said plane, for use on water;

water tank means within said floats for accumulating water for water bombing;

scoop means mounted in each said float, said scoop means defining a forward side, said forward side defining an opening for receiving water therein;

pivotal mounting brackets pivotally mounting said scoop means within each respective said float, said pivotal mounting brackets provided rearward of said forward side of said scoop means;

pivots pivotally mounting said pivot brackets in respective said floats, said pivots provided rearward of said forward side of said scoop means;

scoop operating means for swinging said forward side of said scoop means on said pivotal mounting brackets about said pivots between lowered and raised positions, and, when in said lowered position, said scoop means being located to enter the surface of the water, and cause water to flow upwardly into said tank means;

pairs of dump doors mounted in each said float, in communication with said tank means, said dump doors being swingable between an open dumping position and a closed sealed position; and, operating means for operating said dump doors.

14. A water float assembly as claimed in claim 13 and wherein said scoop means is in communication with a water flow chute mounted within each float, whereby water scooped up by said scoop means passes up said chute, and is discharged within said tank means.

15. A water tank float assembly as claimed in claim 13 wherein said dump doors comprise a pair of doors on each said float, said doors being swingable downwardly and outwardly on opposite sides of said tank means for opening and dumping said water, thereby providing accurate guidance of water from said water tank means into the desired direction.

16. A water tank float assembly as claimed in claim 15 wherein said pairs of doors are provided with seals, for sealing said doors together, and further seals for sealing said doors against fixed portions of said floats, whereby, when said doors are closed, said water tank means is sealed against the entry or escape of water.

17. A water tank float assembly as claimed in claim 15 and including front and rear bulkheads in said floats defining said water tank means, and including door operating shafts in said water tanks, said shafts extending through said front bulkheads, and power means located behind said front bulkheads for operating said shafts.

18. A water tank float assembly as claimed in claim 17 and including gear means mounted on said shafts behind said front bulkheads, said gear means meshing in pairs with one another whereby to coordinate simultaneous rotation of said shafts in respective said tank means in opposite directions.

19. A water tank float assembly as claimed in claim 18 and including linkage means connecting respective said shafts to respective said doors whereby rotation of said shafts causes simultaneous closing of said doors.

20. A water tank float assembly as claimed in claim 13 and including upper opening means on said water tank means, said upper opening means communicating with the atmosphere and permitting outflow and inflow of air, and also permitting outflow of excess water when said water tank means are filled.

21. A method of water bombing from a water bomber float plane, wherein the water bomber plane is equipped with a pair of floats for landing and taking off on water the floats having water tank means within said floats for accumulating water for water bombing, and comprising the steps of;

taxiing said plane across a body of water while said floats at least partially enter said water;

lowering scoop means mounted in each said float down into the surface of said water and causing water to flow upwardly into said tank means through an opening thereby filling said tank means with water;

closing said opening and raising said scoop means;

flying said plane from said body of water when said tank means are full of water, to a fire site; and, operating dump door means mounted in each said float over said fire site thereby opening said dump door means and releasing water from said tank means onto said fire.

22. A method as claimed in claim 21 including the steps of thereafter closing said doors, returning to said body of water and again filling said tank means as aforessaid.

23. A method as claimed in claim 21 and wherein said scoop means is in communication with a water flow chute mounted within each float, and wherein the step of lowering said scoop means causes water to be scooped up by said scoop means to be driven up said chute, and discharged within said tank means through said opening.

24. A method as claimed in claim 21 wherein said plane is equipped with fire retardant additive container means, and means connecting said container means to said tank means, and including the step of causing predetermined quantities of fire retardant to be added to the water contents of said tank means.

25. A method as claimed in claim 21 wherein said dump doors comprise a pair of doors on each said float, said doors being swingable downwardly and outwardly on opposite sides of said tank means and wherein said opening of said doors provides guidance of water from said water tank means into the desired direction.

26. A method as claimed in claim 25 wherein said pairs of doors are provided with seals, for sealing said doors together, and further seals for sealing said doors against fixed portions of said floats, and including the step of closing said doors against said seals to seal said water tank means against the entry or escape of water.

27. A method as claimed in claim 21 wherein said tank means includes upper opening means communicating with the atmosphere and including the steps of permitting outflow and inflow of air, and also permitting outflow of excess water when said water tank means are filled.

28. A water bomber float plane, wherein the water bomber plane is equipped with a pair of floats for landing an d taking off on water, comprising: water tank means within said floats for accumulating water for water bombing;

scoop means mounted in each said float;

scoop operating means for lowering and raising said scoop means between lowered and raised positions, and, when in said lowered position, said scoop means being located to enter the surface of the water, and cause water to flow upwardly into said tank means dump door means mounted in each said float, in communication with said tank means, said dump door means being swingable between an open dumping position and a closed sealed position;

operating means for operating said dump door means between said open and closed positions, and controls for said operating means in said plane; hydraulic operating means, connected to said scoop means, for lowering and raising said scoop means, and control means for said hydraulic operating means;

a water flow chute mounted within each float, in communication with said scoop means whereby water scooped up by said scoop means passes up said chute, and is discharged from said chute within said tank means; and closure door means on said chutes, for closing said chutes when said tank means are filled.

29. A water tank float assembly for use in association with a water bomber float plane, wherein the water bomber plane is equipped with a pair of floats for landing and taking off on water, said float assembly comprising;

a pair of floats adapted to be secured to the underside of said plane, for use on water;

water tank means within said floats for accumulating water for water bombing;

scoop means mounted in each said float;

scoop operating means for lowering and raising said scoop means between lowered and raised positions, and, when in said lowered position, said scoop means being located to enter the surface of the water, and cause water to flow upwardly into said tank means;

dump door means mounted in each said float, in communication with said tank means, said dump door means being swingable between an open dumping position and a closed sealed position;

operating means for operating said dump door means;

water flow chutes mounted within each float, said chutes in communication with said scoop means whereby water scooped up by each said scoop means passes up respective said chute, and is discharged within said tank means; and closure door means on said chutes, for closing said chutes when said tank means are filled.

* * * * *